UNITED STATES PATENT OFFICE.

CHARLES F. LAWTON, OF ROCHESTER, NEW YORK.

FACING COMPOUND.

SPECIFICATION forming part of Letters Patent No. 472,369, dated April 5, 1892.

Application filed September 3, 1891. Serial No. 404,589. (No specimens.)

*To all whom it may concern:*

Be it known that I, CHARLES F. LAWTON, a citizen of the United States, residing at Rochester, in the county of Monroe and State of New York, have invented certain new and useful Improvements in Facing Compounds, of which the following is a specification.

My process consists in a novel preparation, application, and treatment of a compound for facing bricks, stone, concrete, plaster, iron, glass, or wood, or other substances, and has for its object the production of an ornamental appearance and greater durability to the substances or surfaces so treated.

To begin with I melt together in a crucible and proper furnace a mixture composed of fifteen parts of fine silicious sand as pure as may be obtained, eight dry parts of dry carbonate of soda, and one part of charcoal, all in a state of fine division and intimate mixture. After the mixture has become thoroughly melted and evenly combined I pour out the fused mass, and, after cooling, break it into coarse pieces. These pieces are put into a clean iron kettle and boiled with water until the whole is thoroughly dissolved into a moderately-thick transparent sirup or in such proportion that the fused compound shall form about thirty per cent. of the watery solution.

To sixteen quarts of the above solution, which solution I will call "No. 1," I add forty-eight pounds of finely-powdered calcareous marl and ten pounds of sulphur in very fine powder. This mixture, which I denominate "No. 2," makes a thin creamy paste, which may be kept a long time without change if kept closely covered from the air.

If it is desired to treat the face of building-bricks so as to make them look like stone, then to each gallon of No. 2 is added sixteen pounds of clean silicious sand, which is thoroughly stirred in, together with such coloring-matter as may be required to give the paste any desired color.

The mixture is now ready for application, and may be applied by means of a trowel or by the use of a coating-machine to common bricks, and the mixture may be applied to the brick to a thickness of from one-sixteenth of an inch to one-eighth of an inch, or even thicker. A coat of the paste one-sixteenth of an inch thick is generally sufficient. After coating the bricks are laid away to dry, which will generally be accomplished in five hours' time at the temperature of the air. After this so-called "drying" the paste on the face of the bricks will contain from ten to twenty per cent. of water, although the paste will be of stony hardness. The bricks are now piled onto an iron car and the car run into a close room, the air of which is heated up to a temperature of from 220° to 230° Fahrenheit, which elevation of temperature causes the water still remaining in the paste (though it is apparently dry) to react with the sulphur and the soda in the compound, thereby producing sodium thiosulphate ($Na_2S_2O_3$) and a small quantity of sodium sulphide. Though the indications of this last substance are slight, it may be the intermediary product previous to the formation of the thiosulphate. The result of this reaction is that the silica in the paste passes from the soluble to the insoluble state. The paste may now be exposed to the carbonic acid of the atmosphere without being in any way affected and it can be exposed to prolonged soaking in water without being softened or disintegrated. The sodium thiosulphate in the paste will be dissolved out; but the body, color, and hardness of the compound appear to be unaffected by such soaking.

Instead of using silicious sand, the mixture No. 2 may be mixed with marble-dust, powdered steatite, powdered bricks of any special color, or many other forms of inert matter to give body and color to the paste, and instead of these mixtures themselves forming the outer surface or coating of the brick, concrete, stone, iron, or wood to which the mixtures are applied the paste while still soft may be studded full of fine gravel or stones or broken crockery or colored bits of glass.

The paste may also be used as the cementing material to fix sheets of smooth glass onto the face of each brick or other surface, and then the color of the cement will show through the glass and the surface of the material to which it is applied will look as though it were enameled.

For indoor work, where not exposed to water, the heating of the paste is unnecessary, as time alone appears to produce the same changes in the paste as heat, though the time required for this is a long one.

The proportions of the several ingredients may be varied somewhat without departing from the spirit of my invention.

Having thus described my invention, what I claim, and desire to secure by Letters Patent, is—

1. The improvement in the process of manufacturing facing compounds, which consists of the following steps, to wit: first, forming a soda silicate; second, mixing therewith calcareous marl and sulphur; third, adding an inert substance to give color or body or both, and, fourth, heating the compound after it is applied, all substantially as described.

2. The improvement in the process of manufacturing facing compounds, consisting in rendering an alkaline soluble silicate paste insoluble by the production of thiosulphuric acid and alkaline sulphides in immediate presence of and contact with the soluble silicate.

3. The improvement in the process of manufacturing facing compounds, consisting in producing thiosulphates and sulphides in a hardened mixture of a soluble silicate, sulphur, carbonate of lime, and inert matter by moderate heating.

4. The herein-described composition of matter, composed of water, soda silicate, calcareous marl, and sulphur.

5. The herein-described method of facing bricks, &c., which consists in making a soluble silicate paste, applying the paste to the face of the brick, then adding to the paste broken stone, &c., and subsequently rendering the paste insoluble by the application of heat.

6. The herein-described composition of matter, consisting of water, soda silicate, calcareous marl, sulphur, and an inert substance, all combined in substantially the proportions stated.

In witness whereof I hereunto set my hand in the presence of two witnesses.

CHARLES F. LAWTON.

Witnesses:
M. H. BRIGGS,
CHAS. A. EDGERTON.